C. F. DEMEK.
SPHERE FOR ACROBATIC PURPOSES.
APPLICATION FILED JULY 19, 1909.
942,250.
Patented Dec. 7, 1909.
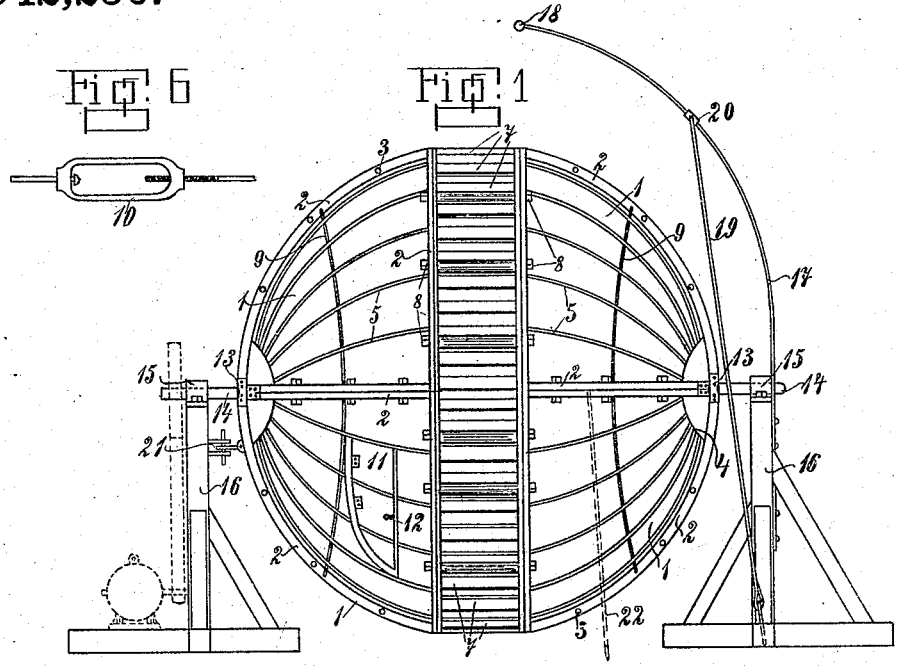
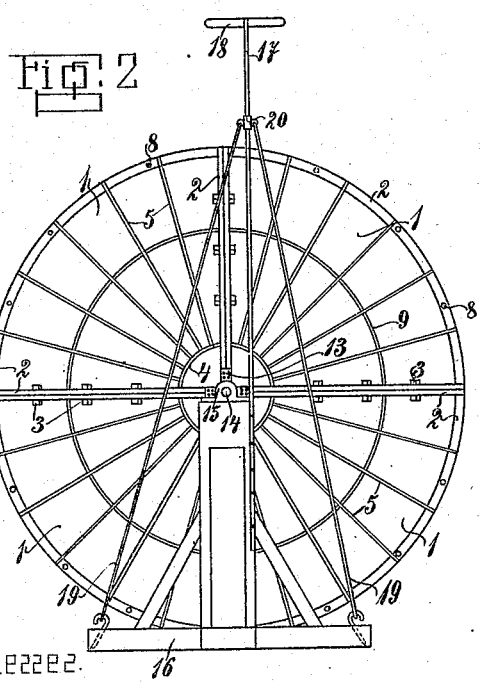
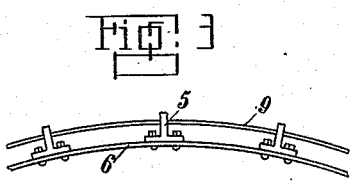
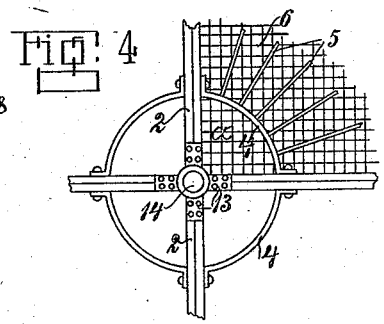
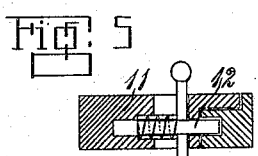

UNITED STATES PATENT OFFICE.

COLOMAN FELIX DEMEK, OF BERLIN, GERMANY.

SPHERE FOR ACROBATIC PURPOSES.

942,250.     Specification of Letters Patent.     Patented Dec. 7, 1909.

Application filed July 19, 1909. Serial No. 508,485.

*To all whom it may concern:*

Be it known that I, COLOMAN FELIX DEMEK, a subject of the German Emperor, and residing at Berlin, Germany, have invented certain new and useful Improvements in Spheres for Acrobatic Purposes, of which the following is a specification.

The subject-matter of my invention is a dismemberable sphere or ball for acrobatic purposes.

Spheres or balls for acrobatic purposes have been constructed heretofore by attaching on two oppositely-arranged, circular, convex disks ribs provided with grooves in which corresponding parts composed of wire-netting are inserted. This construction, however, is very unsuitable, troublesome and occupies much time in erection, as there are too many individual parts.

My constructional form of a dismemberable sphere for acrobatic purposes is a technical improvement in all respects as compared with those known heretofore, so that the same is perfectly adapted to its purposes, namely to enable an acrobat to ride on the outside of or in the same.

One constructional form of my improved sphere is represented in the accompanying drawing by way of example.

In said drawing:—Figure 1 is a front elevation and Fig. 2 a side elevation of the sphere, whereas Figs. 3 to 6 show various parts of the sphere or their connections in detail views.

The sphere or ball is preferably composed of eight segmental parts 1 each bounded by bars 2 held together by screw bolts 3. Arc-shaped members 4 are riveted to the bars 2 in the angles. Preferably welded to these members 4 are T-bars 5, the other ends of which are welded or riveted to the corresponding, opposite, limitary bars 2. The inner curved face of each of the eight segments is covered with wire-netting 6 which is attached by flat-headed rivets to the head pieces of the T-bars or to the faces of the bars facing the inside of the sphere, so that the interior of the sphere is completely covered with the net and is as smooth as possible and consequently offers no obstruction to a person traveling in the sphere.

Between the eight parts 1 is a track consisting of four parts. Each individual part of said track is bounded by bars 2 and between these bars cross-bars 7 are riveted preferably with intervals between them of eight or ten centimeters. Each two segments and the part of the track between them are held together by screw bolts 8. In order to stiffen or tension the surface of the sphere still more, each T-bar 5 is perforated at one place and through these holes is threaded a wire rope 9 whose ends are drawn together by tightening screws 10 of well-known kind, so that the surface of the sphere is subjected to a stress of a definite amount in order to stand the pressure of the person traveling upon or in it. In the one segment is an inwardly opening door 11 which is locked by means of a spring-pressed bolt 12.

The eight bars 2 running together from the centers of each hemisphere are attached by screws or rivets to iron crosses 13, 13, on which pivots or axles 14, 14 are arranged which are journaled in the simple or ball bearings 15, 15 in the standards 16.

In order to afford a hold to the artist or acrobat running outside the sphere until the sphere is rotated, to the one pedestal 16 is screwed an iron pipe 17 whose top end carries a small cross bar 18 to which the acrobat holds on at first. The pipe 17 is prevented from bending laterally by ropes 19 which proceed to the cross bars of the pedestal 16 from a sleeve 20 attached to the pipe 17. The sphere can be rotated by means of an electric motor or in other suitable manner, and for increasing the acrobatic effect the sphere may be illuminated by colored electric incandescent lamps.

The track may consist of iron or wooden bars which are attached to a band provided with a buckle. Of course the T-bars 5 must then be so long that the boundary bars 2 can be bolted directly one against another. The track is then simply placed round the sphere and buckled to the same.

In order to be able to hold the sphere at rest, pivoted on one bar 2 is a tongue 21 which can be placed between two tongues fixed on the standard 16 and held in these by a bolt. The sphere may be held in addition by ropes 22 which lead from the bars 2 to the ground in which they are held by means of pegs or screws.

I claim:—

1. The combination of two standards, a sphere comprising a plurality of segments each comprising boundary bars and longitudinal ribs mounted revolubly on said standards, and tensioned means for stiffening the surface of the sphere.

2. The combination of two standards, a sphere comprising a plurality of segments each comprising boundary bars and longitudinal ribs mounted revolubly on said standards, and tensioned means for stiffening the surface of the sphere, and a holder or support attached to one of said standards and located above said sphere.

3. The combination of two standards, a sphere comprising a plurality of segments, each comprising boundary bars and longitudinal T-shaped ribs mounted revolubly on said standards, and tensioned means for stiffening the surface of the sphere, and a wire net attached to said ribs inside the sphere.

4. The combination of two standards, a sphere comprising two sets of segments and cross-bars forming a track connecting the same mounted revolubly on said standards, each segment being composed of boundary bars and longitudinal ribs, and tensioned means for stiffening the surface of the sphere.

5. The combination of two standards, a sphere comprising a plurality of segments each comprising boundary bars and longitudinal, perforated, T-shaped ribs mounted revolubly on said standards, and tensioned ropes passing through said ribs.

6. The combination of two standards, a sphere comprising a plurality of segments, each comprising boundary bars and longitudinal ribs, mounted revolubly on said standards, and tensioned means for stiffening the surface of the sphere, one of said segments having an inwardly-opening door.

7. The combination of two standards, a sphere comprising a plurality of segments each comprising boundary bars and longitudinal ribs mounted revolubly on said standards, tensioned means for stiffening the surface of the sphere, and means for fastening said sphere to one of said standards.

8. In a sphere for acrobatic purposes, a hemisphere comprising four segments, each segment comprising boundary bars (2) and longitudinal ribs (5), a cross-shaped member (13) attached to said segments, and a pivot fixed to said member.

In testimony whereof I have hereunto set my hand in the presence of two subscribing witnesses.

COLOMAN FELIX DEMEK.

Witnesses:
WOLDEMAR HAUPT,
HENRY HASPER.